(12) United States Patent
Babkin et al.

(10) Patent No.: US 12,433,657 B2
(45) Date of Patent: Oct. 7, 2025

(54) PLANAR-SHAPED THERMAL BALLOON FOR MESENTERIC FAT REDUCTION

(71) Applicant: B2M MEDICAL, INC., Irvine, CA (US)

(72) Inventors: Alexei V. Babkin, Dana Point, CA (US); Rafi Mazor, San Diego, CA (US); Edmund J. Roschak, Irvine, CA (US); William Vincent, Irvine, CA (US); Pedram Nourian, Tustin, CA (US); Pedram Pourfard, Rancho Santa Margarita, CA (US); Nicolei King, Laguna Hills, CA (US); Shirzad Shahriari, Laguna Hills, CA (US)

(73) Assignee: B2M Medical, Inc., Irvine, CA (US)

( * ) Notice: Subject to any disclaimer, the term of this patent is extended or adjusted under 35 U.S.C. 154(b) by 0 days.

(21) Appl. No.: 19/066,601

(22) Filed: Feb. 28, 2025

(65) Prior Publication Data

US 2025/0195125 A1   Jun. 19, 2025

Related U.S. Application Data

(63) Continuation-in-part of application No. PCT/US2024/042835, filed on Aug. 18, 2024, and a
(Continued)

(51) Int. Cl.
*A61B 18/00* (2006.01)
*A61B 90/00* (2016.01)

(52) U.S. Cl.
CPC .............. *A61B 18/00* (2013.01); *A61B 90/06* (2016.02); *A61B 2018/00494* (2013.01);
(Continued)

(58) Field of Classification Search
CPC .................... A61B 18/00; A61B 90/06; A61B 2018/00494; A61B 2018/00642;
(Continued)

(56) References Cited

U.S. PATENT DOCUMENTS

| | | |
|---|---|---|
| 3,674,031 A | 7/1972 | Weiche |
| 4,447,227 A | 5/1984 | Kotsanis |

(Continued)

FOREIGN PATENT DOCUMENTS

| | | |
|---|---|---|
| CN | 115137549 A | 10/2022 |
| EP | 2856986 A1 | 4/2015 |

(Continued)

OTHER PUBLICATIONS

U.S. Appl. No. 17/568,207, filed Jan. 4, 2022, Alexei V. Babkin
(Continued)

*Primary Examiner* — Aaron F Roane
(74) *Attorney, Agent, or Firm* — Batt IP A Law Corporation; Richard Batt

(57) ABSTRACT

A surgical device for reducing visceral fat in the abdominal cavity comprises an elongate shaft and an inflatable member. The inflatable member comprises a small-profile deflated configuration for being advanced into the abdominal cavity and a large-profile inflated configuration comprising a planar distal treatment surface for treating the visceral fat. The thermal fluid, preferably a gas, is circulated through the inflatable member at a temperature range sufficient to cause cryolipolysis to the fat cells but not damage non-target tissues. The inflatable member can have several chambers, reinforcing members, and ports to provide controlled flow patterns that maintain the shape of the inflatable member when inflated.

17 Claims, 13 Drawing Sheets

Related U.S. Application Data continuation-in-part of application No. PCT/US2024/020622, filed on Mar. 20, 2024, and a continuation-in-part of application No. 17/568,207, filed on Jan. 4, 2022.

(60) Provisional application No. 63/520,929, filed on Aug. 21, 2023, provisional application No. 63/453,748, filed on Mar. 21, 2023.

(52) U.S. Cl.
CPC ............... *A61B 2018/00642* (2013.01); *A61B 2018/00678* (2013.01); *A61B 2018/00714* (2013.01); *A61B 2018/00744* (2013.01); *A61B 2018/00761* (2013.01); *A61B 2018/00797* (2013.01)

(58) Field of Classification Search
CPC ........... A61B 2018/00678; A61B 2018/00714; A61B 2018/00744; A61B 2018/00761; A61B 2018/00797
USPC .............................................................. 606/1
See application file for complete search history.

(56) References Cited

U.S. PATENT DOCUMENTS

| | | | |
|---|---|---|---|
| 5,680,860 A | 10/1997 | Imran | |
| 6,032,675 A | 3/2000 | Rubinsky | |
| 6,332,089 B1 | 12/2001 | Acker et al. | |
| 6,719,724 B1 | 4/2004 | Walker et al. | |
| 7,141,979 B2 | 11/2006 | Marek | |
| 7,789,849 B2 | 9/2010 | Busby et al. | |
| 9,861,423 B2 | 1/2018 | Lalonde et al. | |
| 9,980,765 B2 | 5/2018 | Avram et al. | |
| 10,667,854 B2 | 6/2020 | Babkin et al. | |
| 10,888,366 B2 | 1/2021 | Allison | |
| 2001/0023334 A1 | 9/2001 | Goar et al. | |
| 2003/0220674 A1 | 11/2003 | Anderson et al. | |
| 2005/0131401 A1 | 6/2005 | Malecki et al. | |
| 2006/0036300 A1 | 2/2006 | Kreindel | |
| 2006/0184048 A1 | 8/2006 | Saadat | |
| 2007/0010861 A1 | 1/2007 | Anderson et al. | |
| 2007/0282324 A1* | 12/2007 | Vaska ................ | A61B 18/1402 606/41 |
| 2007/0287886 A1 | 12/2007 | Saadat | |
| 2008/0015445 A1 | 1/2008 | Saadat et al. | |
| 2008/0077202 A1 | 3/2008 | Levinson | |
| 2008/0097560 A1 | 4/2008 | Radziunas et al. | |
| 2009/0076498 A1 | 3/2009 | Saadat et al. | |
| 2009/0118722 A1 | 5/2009 | Ebbers et al. | |
| 2009/0270851 A1 | 10/2009 | Babkin et al. | |
| 2010/0004506 A1 | 1/2010 | Saadat | |
| 2010/0049186 A1 | 2/2010 | Ingle et al. | |
| 2010/0152824 A1 | 6/2010 | Allison | |
| 2010/0256621 A1 | 10/2010 | Babkin et al. | |
| 2012/0283713 A1 | 11/2012 | Mihalik et al. | |
| 2013/0103019 A1 | 4/2013 | Joye et al. | |
| 2013/0190744 A1 | 7/2013 | Avram et al. | |
| 2013/0317497 A1 | 11/2013 | Edwards et al. | |
| 2014/0188039 A1 | 7/2014 | Andrew et al. | |
| 2014/0277302 A1 | 9/2014 | Weber et al. | |
| 2015/0289920 A1 | 10/2015 | Burnett et al. | |
| 2015/0328077 A1 | 11/2015 | Levinson | |
| 2017/0007310 A1 | 1/2017 | Rajagopalan et al. | |
| 2018/0085554 A1 | 3/2018 | Kassab et al. | |
| 2018/0146999 A1 | 5/2018 | Baust | |
| 2020/0061202 A1 | 2/2020 | Guo et al. | |
| 2020/0246054 A1 | 8/2020 | Agha | |
| 2021/0030457 A1 | 2/2021 | Avram et al. | |
| 2021/0077183 A1* | 3/2021 | Basu ................... | A61B 5/6852 |
| 2021/0353351 A1 | 11/2021 | Mazor et al. | |
| 2022/0062033 A1 | 3/2022 | Dabrowiak et al. | |
| 2022/0354687 A1 | 11/2022 | Ward et al. | |
| 2023/0000669 A1 | 1/2023 | Babkin et al. | |
| 2023/0039683 A1 | 2/2023 | Weber et al. | |
| 2023/0210574 A1 | 7/2023 | Babkin et al. | |

FOREIGN PATENT DOCUMENTS

| | | |
|---|---|---|
| WO | 0228331 A1 | 4/2002 |
| WO | 2003078596 A2 | 9/2003 |
| WO | 2008055243 A2 | 5/2008 |
| WO | 2011100692 A1 | 8/2011 |
| WO | 2012058430 A2 | 5/2012 |
| WO | 2013181660 A1 | 12/2013 |
| WO | 2017197323 A1 | 11/2017 |
| WO | 2020061202 A1 | 3/2020 |
| WO | 2021102301 A1 | 5/2021 |
| WO | 2024196973 A1 | 9/2024 |
| WO | 2025042794 A1 | 2/2025 |

OTHER PUBLICATIONS

U.S. Appl. No. 17/777,826, filed May 18, 2022, Alexei V. Babkin
First Examination Report of Australian application No. 2019342120, dated Aug. 29, 2024.
International Search Report and Written Opinion by ISA/US of PCT/US2019/051746, Jan. 9, 2020.
International Search Report and Written Opinion by ISA/US of PCT/US2020/061568, Feb. 5, 2021.
International Search Report and Written Opinion by ISA/US of PCT/US22/72511, Aug. 2, 2022.
International Search Report and Written Opinion by ISA/US of PCT/US22/82674, Jun. 14, 2023.
International Search Report and Written Opinion by the ISA/US of PCT/US24/20622, dated Jun. 27, 2024.
International Search Report and Written Opinion by the ISA/US of PCT/US24/42835, dated Dec. 27, 2024.
Second Examination Report of Australian application No. 2019342120, dated Apr. 4, 2025.

* cited by examiner

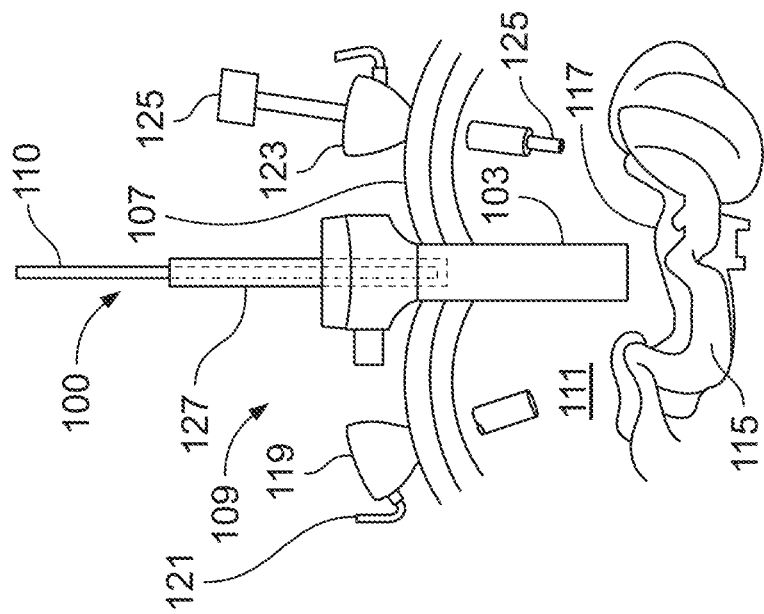
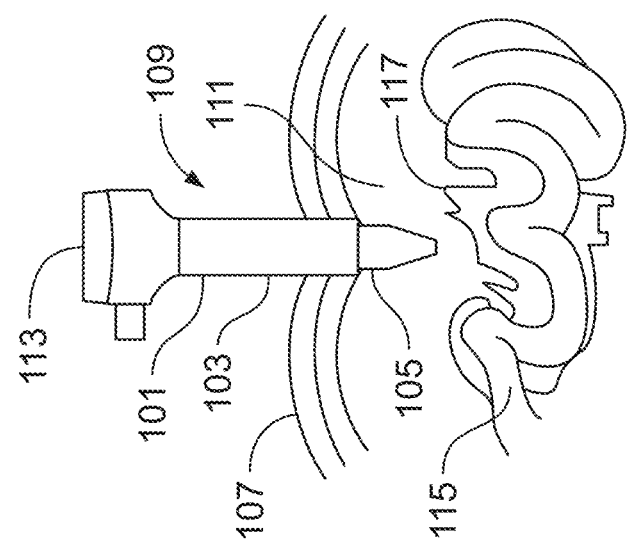

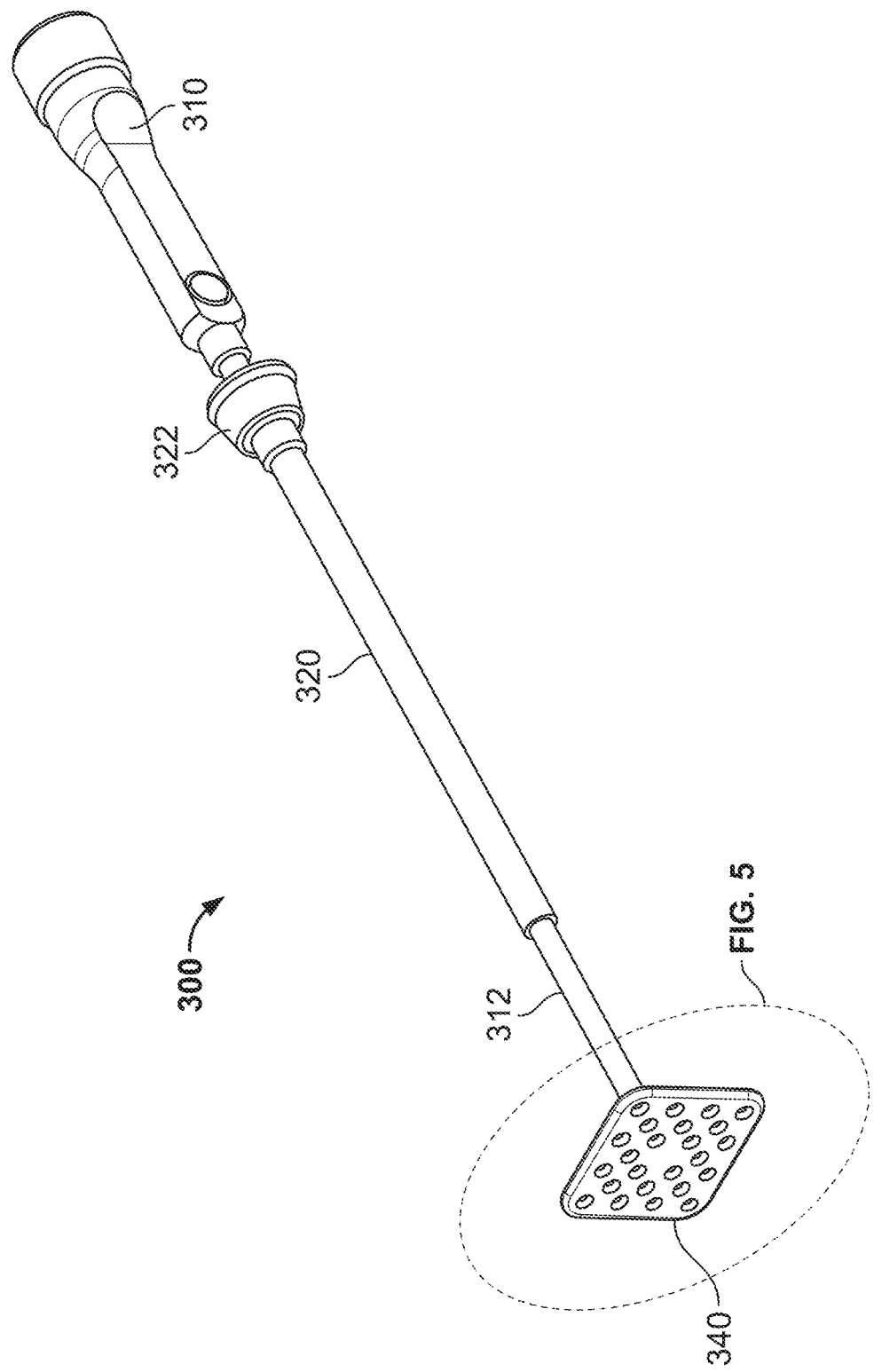

PLANAR-SHAPED THERMAL BALLOON FOR MESENTERIC FAT REDUCTION

CROSS-REFERENCE TO RELATED APPLICATIONS

This is a continuation in part application of international patent application no. PCT/US24/42835, filed Aug. 18, 2024, entitled "Multimodule Console for Controlling Thermal-based Non-ablative Surgical Device for Mesenteric Fat Reduction," which claims priority to provisional patent application No. 63/520,929, filed Aug. 21, 2023, and entitled "Multimodule Console for Controlling Thermal-based Non-ablative Surgical Device for Mesenteric Fat Reduction". This application is also a continuation in part application of international patent application no. PCT/US24/20622, filed Mar. 20, 2024, entitled "Planar-shaped Thermal Balloon for Mesenteric Fat Reduction," which claims priority to provisional patent application No. 63/453,748, filed Mar. 21, 2023, and entitled "Planar-shaped Thermal Balloon for Mesenteric Fat Reduction". This application is also a continuation in part application of application Ser. No. 17/568,207, filed Jan. 4, 2022, entitled "Method and System for Minimally Invasive Removal of Mesenteric Fat", each of which is incorporated herein by reference in its entirety for all purposes.

BACKGROUND OF THE INVENTION

Visceral fat is found inside the abdominal cavity and wraps around internal organs, as opposed to subcutaneous fat which is stored just below the skin. Visceral fat, and in particular mesenteric fat, may be found in the abdomen, under the abdominal muscles. Visceral fat is associated with high blood pressure, increased risk of heart disease, insulin resistance and diabetes, stroke, some cancers, and continued presence in the body may contribute to these conditions. Though diet and exercise can help eliminate visceral fat, diet and exercise are not well-tolerated by the typical overweight patient.

Surgical excision and ablation are not good options because of the risk of damaging the vasculature, nerves, and lymph nodes associated with the mesenteric fat.

Accordingly, apparatuses for effectively reducing visceral fat are still desired.

SUMMARY OF THE INVENTION

A surgical device for reducing visceral fat in the abdominal cavity comprises an elongate shaft and an inflatable member. The inflatable member comprises a small-profile deflated configuration for being advanced into the abdominal cavity and a large-profile inflated configuration comprising a planar distal treatment surface for treating the visceral fat. The thermal fluid, preferably a gas, is circulated through the inflatable member at a temperature range sufficient to cause cryolipolysis to the fat cells but not damage non-target tissues. The inflatable member can have several chambers, reinforcing members, and ports to provide controlled flow patterns that maintain the shape of the inflatable member when activated.

In embodiments, the inflatable member comprises a plurality of chambers.

In embodiments, the inflatable member has a treatment chamber separated from a supporting chamber by a divider and optionally, the supporting chamber and the front chamber have a substantially equal volume. The divider includes at least one opening for fluidly connecting the treatment chamber to the supporting chamber.

In embodiments, the divider includes a plurality of openings, and preferably, the openings are arranged around the periphery of the divider.

In embodiments, the inflatable member further comprises a plurality of reinforcing members to maintain the treatment surface in a fixed relation to the rear surface when the inflatable member is inflated. The reinforcing members can be closed cells extending from the rear surface to the treatment surface. The reinforcing members can be cylindrically-shaped, and optionally, each reinforcing member forms a dimple at the treatment surface.

In embodiments, the inflatable member is adapted and operable to direct the thermal fluid evenly therethrough such that the planar distal treatment surface has a substantially uniform temperature and remains planar even when applied against the visceral fat.

In embodiments, the geometry of the flow channels and profile of the inflatable member cause the inflatable member to be somewhat stiff when activated, and thereby maintain the desired planar shape even when urged against tissues having a change in elevation.

In embodiments, the inflatable member has a square profile when inflated.

In embodiments, the inflatable member has a mattress-like shape when inflated.

In embodiments, the inflatable member has a flat planar distal treatment surface when inflated.

In embodiments, the thermal fluid is circulated through the inflatable member by the inlet line and outlet line at a temperature sufficient to cause cryolipolysis, thereby leaving the untargeted (non-fat cells) unablated.

In embodiments, the thermal fluid is circulated through the inflatable member at a temperature between $-20°$ C. and $-40°$ C.

In embodiments, a system for cooling tissue comprises: a thermal fluid source; a surgical device having an inflatable member as recited herein and coupled to the thermal fluid source; a temperature sensor arranged to measure the thermal fluid entering (or within) the inflatable member ($T_i$); a pressure control device to control the pressure of the thermal fluid transported to the inflatable member ($P_i$); and a controller operable to maintain the temperature in the inflatable member between $-35°$ C. and $-40°$ C., and optionally about $-40°$ C., based on $T_i$ and by adjusting the $P_i$ using the pressure control device.

In embodiments, the pressure control device is a regulator or pump.

In embodiments, the controller is operable to compute total energy removed from the tissue, and optionally, halt the cooling once a threshold amount of energy has been delivered.

In embodiments, a method of using the system as described herein to cool tissue comprises cooling the tissue for a time duration based on the thickness of the tissue.

The time duration can vary and in embodiments, ranges from 10 to 120 sec. for thickness' ranging from 1-5 mm, and in some embodiments, 20-40 sec. for thinner tissue or when multiple cooling devices are applied simultaneously as described herein.

In embodiments, the tissue thickness is estimated by the physician, optionally, visually.

In embodiments, the method comprises providing two surgical devices, and sandwiching the tissue between opposing inflatable members, and cooling the tissue between the opposing inflatable members for a modified time duration based on the thickness of the tissue, and a predicted time temperature profile arising from both of the opposing inflatable members. The modified time duration can vary, and is typically shorter than the unmodified time duration. In embodiments, the modified time duration ranges from 10 to 20 sec, optionally about 15-18 seconds.

In some embodiments, the method comprises cooling the target tissue to below 10 C, to below 0° C., to below −10° C., and in some instances to between −20° C. and −40° C.

In some embodiments, the controller is operable to cool the target tissue to below 10° C., to below 0° C., to below −10° C., and in some instances to between −20° C. and −40° C.

In an embodiment of the invention, a system comprises a pair of cooling probes (optionally flat faced) configured for insertion into the abdomen and placement on opposite sides of a section of mesentery for application of cooling power to the mesentery. The cooling probes have tissue-contacting surfaces supplied with cooling power, such as flow of a cooling fluid proximate the surfaces.

In an embodiment of the invention, a cooling surface of each probe is provided with positioning transmitters/sensors, operable to transmit and/or receive signal from corresponding transmitters/sensors on the other probe, to aid in determining the degree of alignment of the probes on opposite surfaces of the mesentery as well as determine the distance from one another.

In an embodiment of invention, the cooling power to be applied, and the length of time it is to be applied, is computed on a processor based on the thickness of the mesentery as determined by positioning sensors arranged or otherwise embedded in the treatment devices.

In an embodiment of the invention, the energy to be applied to the tissue is computed, on a processor, in order to cool the tissue to a predetermined temperature at a given depth.

In an embodiment of the invention, the energy may be controlled in response to temperature measurements while applying cooling power. For example, in some embodiments of the invention, the energy may be determined, on a processor, based on the difference between two temperature sensors: one sensor reading temperature in the treatment portion (e.g., balloon) and a second sensor reading the temperature of the gas leaving the treatment portion (e.g., balloon) after cooling the tissue.

In some embodiments, an electronic pressure control device, optionally, a regulator, is adjusted to control energy based on the temperature measurements.

BRIEF DESCRIPTION OF DRAWINGS

FIGS. 2A-2D illustrate sequentially a laparoscopic method for reducing mesenteric fat in accordance with an embodiment of the invention;

FIGS. 3-4 illustrate sequentially deploying the treatment device from a delivery configuration to a deployed configuration, respectively, in accordance with an embodiment of the invention;

Figure 1:
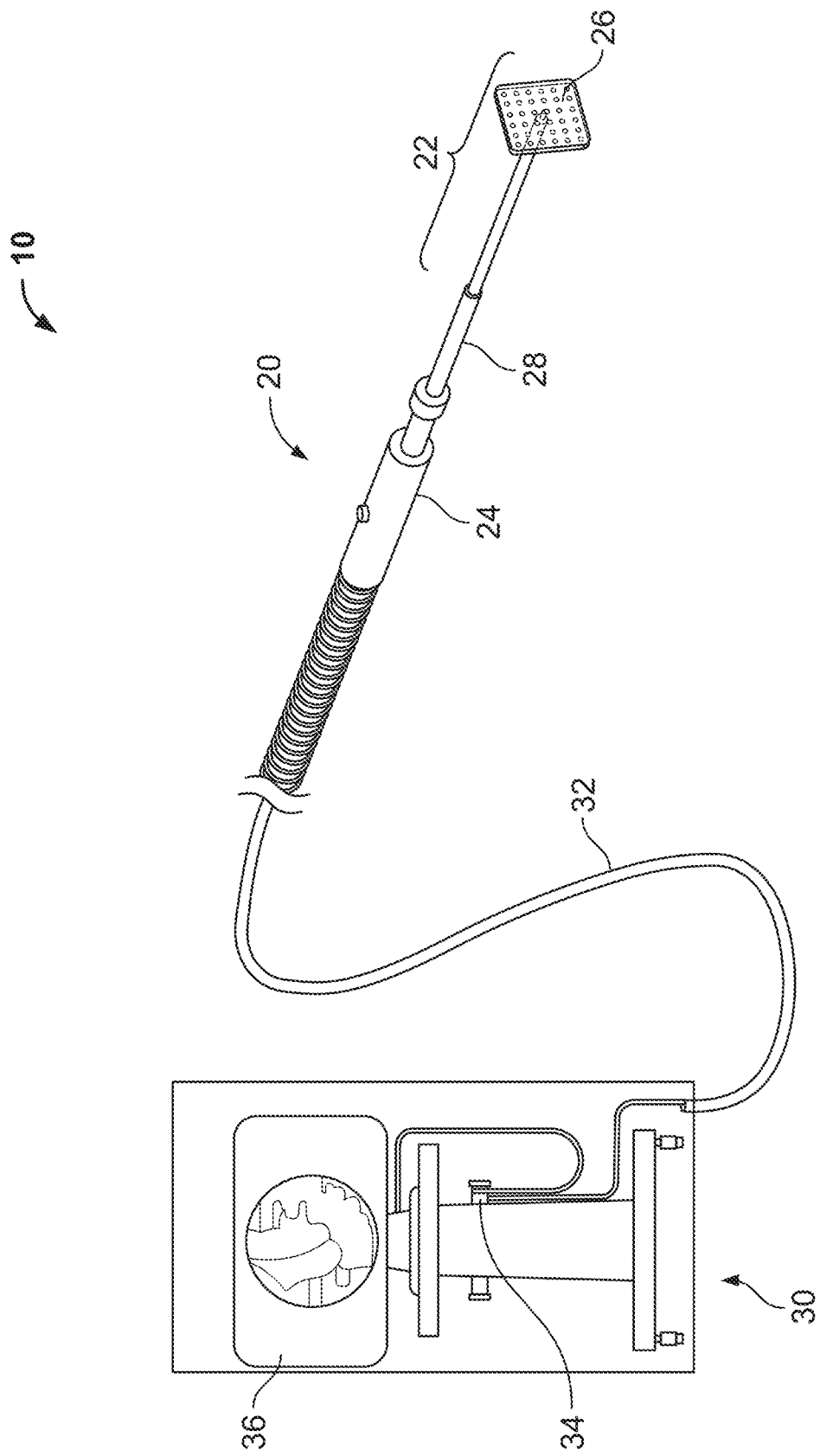
FIG. 1 illustrates a schematic drawing of a system for reducing mesenteric fat in accordance with an embodiment of the invention.

The description, objects and advantages of embodiments of the present invention will become apparent from the detailed description to follow, together with the accompanying drawings.

DETAILED DESCRIPTION OF THE INVENTION

Before the present invention is described in greater detail, it is to be understood that this invention is not limited to particular embodiments described, as such can, of course, vary. It is also to be understood that the terminology used herein is for the purpose of describing particular embodiments only, and is not intended to be limiting, since the scope of the present invention will be limited only by the appended claims. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges can independently be included in the smaller ranges and are also encompassed within the invention, subject to any specifically excluded limit in the stated range. Where the stated range includes one or both of the limits, ranges excluding either or both of those included limits are also included in the invention. Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described. It is noted that, as used herein and in the appended claims, the singular forms "a", "an", and "the" include plural referents unless the context clearly dictates otherwise. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation. As will be apparent to those of skill in the art upon reading this disclosure, each of the individual embodiments described and illustrated herein has discrete components and features which can be readily separated from or combined with the features of any of the other several embodiments without departing from the scope or spirit of the present invention.

Any recited method can be carried out in the order of events recited or in any other order that is logically possible.

All existing subject matter mentioned herein (e.g., publications, patents, patent applications and hardware) is incorporated by reference herein in its entirety except insofar as the subject matter may conflict with that of the present invention (in which case what is present herein shall prevail).

Methods and systems for cooling visceral fat while leaving surrounding tissue unharmed are disclosed in our prior International Patent Publication WO 2020/061202 (published Mar. 26, 2020; International Patent Publication WO 2021102301 (published May 27, 2021); and International Patent Application No PCT/US22/82674, filed Dec. 31, 2022, entitled METHOD AND SYSTEM FOR MINIMALLY INVASIVE REMOVAL OF MESENTERIC FAT, each of which is incorporated herein by reference in its entirety for all purposes. The inventors have found that visceral fat is more susceptible to destruction by cooling to cold temperatures which do not harm surrounding or nearby tissue such as blood vessels, nerves and lymph nodes. Visceral fat can be broken down by cooling to temperatures which traditionally have been considered non-ablative temperatures. These so-called non-ablative temperatures typically range from +10° C. to −40° C., and more preferably −20° C. to −40° C. Cryolipolysis is limited to the visceral fat and the surrounding or nearby tissue is not damaged. Cryogenically deadened visceral fat will be removed by the body over the course of a few weeks.

Turning now to FIG. 1, a treatment system 10 for reducing mesenteric fat in accordance with an embodiment of the invention is shown. The system 10 includes a treatment device 20 connected to a console 30 via an umbilical cord 32. The treatment device 20 includes a distal treatment section 22 extending from a handle 24. In the system shown in FIG. 1, the cooling element 26 is shown in a deployed and inflated configuration, with sheath 28 retracted. The cooling element 26 is shown in the form of an inflated mattress or pillow with a planar distal treatment surface. In an application, discussed further herein, the planar treatment surface delivers cooling energy to the target tissue, namely, the visceral and mesenteric fat.

As described further herein, a coolant such as a gas or liquid is circulated between the treatment device 20 and the console 30 via umbilical cord 32. In embodiments, the umbilical cord is flexible and detachably coupled to the console via a connector 34. In embodiments the length of the umbilical cord ranges from 3-8 feet.

Console 30 may include a number of additional components and features including, for example, computer and display 36 which are operable to connect with a laparoscope or other imaging equipment for displaying the operative field and/or target anatomy during the procedure. Console may include a coolant source, heat exchanger, power supply, and controller for controlling and monitoring coolant flow, temperature, time elapsed, and other parameters as desired.

Figure 2D:
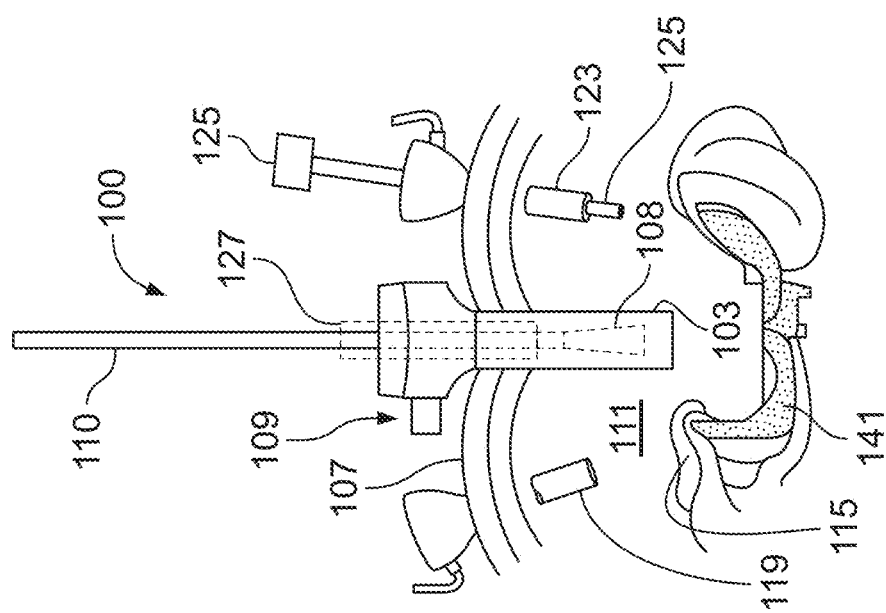

FIGS. 2A-2D describe a laparoscopic method for reducing mesenteric fat in accordance with an embodiment of the invention. With reference to FIG. 2A, a first trocar 101 comprising a cannula 103 and an obturator 105 is shown inserted through an abdominal wall 107 of a patient 109 such that the cannula 103 gains access to the abdominal cavity 111 of the patient 109. The obturator 105 is then removed with the cannula 103 automatically sealing at the seal 113. A small intestine 115 of the patient 109 includes a portion of visceral fat 117 to be treated.

In FIG. 2B, a second trocar 119 is shown inserted through the abdominal wall 107 to provide insufflation via an insufflation line 121. The space in the abdominal cavity 111 is thus enlarged. Alternatively, the insufflation may be applied through the first trocar 101. After insufflation, the first trocar 101 may be more safely inserted further into the abdominal cavity 111, as shown in FIG. 2B. A third trocar 123 is inserted through the abdominal wall 107 and is used to provide access to a laparoscope 125 for illuminating and viewing the procedure. The size of trocars 101, 119, 123 may vary. Non-limiting exemplary sizes include: 5 mm trocars, 10 mm trocars, or 12 mm trocars depending upon the size requirements of the devices to be placed through the lumens.

The cooling probe 100 and introducer sheath 127 are then advanced together through the lumen of the cannula 103.

Figure 2C:
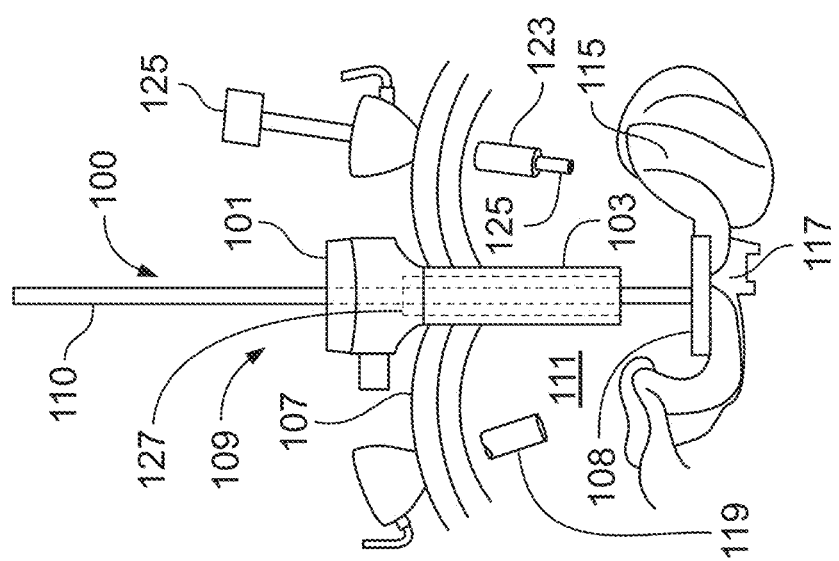

Next, with reference to FIG. 2C, the introducer sheath 127 is retracted by the user. The cooling probe 100 is now advanced by the user so that the mattress 108 exits the cannula 103 and is able to be inflated to its expanded configuration, described herein. As shown in FIG. 2C, the mattress 108 is placed over a desired portion of visceral fat 117 to be treated, and activated. The coolant inflates and circulates through the mattress 108, thus removing heat from the visceral fat 117 until the visceral fat is brought to a target temperature to cause cryolipolysis.

Exemplary target temperatures for the cooling apparatus range from −60° C. to −35° C., more preferably between −35° C. to −45° C., and most preferably about −40° C. for the portion of the cooling device to make contact with the target tissue. Exemplary target temperatures for the tissue range from −40° C. to +10° C., −40° C. to <−10° C., and in some embodiments between −10° C. to +10° C. or between 0° C. and +10° C. Without intending to be bound by theory, by maintaining the visceral fat at a temperature between +10° C. and 31 40° C., or between about −20° C. and about −40° C. for a duration of, for example, 10 to 30 seconds, up to 10 minutes, the visceral fat undergoes apoptosis while the normal intestinal tissues are protected from significant damage. This is because the visceral fat tends to be more sensitive to the lower temperatures than the surrounding normal tissue.

With reference to FIG. 2D, the cooling is terminated. The cooling probe 100 is retracted into the lumen of the cannula 103, compressing the deflated balloon 108 of the cooling probe 100 toward its collapsed configuration. A treated portion 141 of the visceral fat is shown in FIG. 2D.

It is to be understood that although FIGS. 2A-2D illustrate a method for reducing the visceral fat of a patient, the invention is not intended to be so limited and may include other steps except where excluded in any appended claims. Any of the steps or features described herein may be omitted or combined in any logical manner except where such steps or features conflict with one another.

Figure 3:
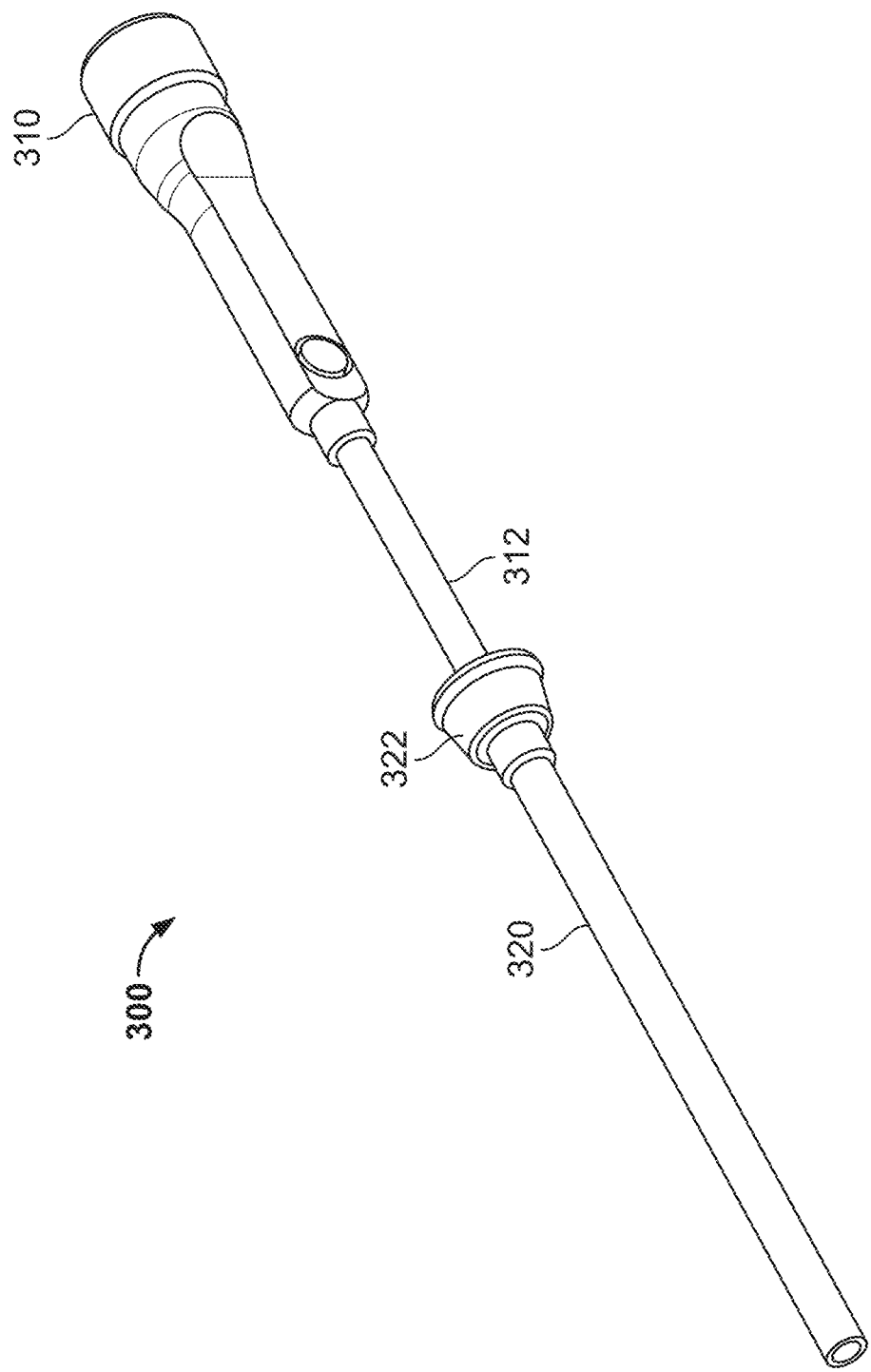

FIGS. 3-4 illustrate a cooling probe 300 and introducer sheath 320 arranged in an extended configuration (for device insertion and withdrawal) and a retracted configuration (for tissue treatment), respectively.

With initial reference to FIG. 3, introducer sheath 320 is shown extended distally. Consequently, the collapsed/folded balloon is hidden from view by the sheath.

Turning to FIG. 4, introducer sheath 320 is shown retracted proximally along shaft 312. To retract the sheath 320, flared proximal end 322 is pulled relative to handle 310, exposing the balloon 340. The balloon 340 is then activated, as described herein, causing it to inflate into its predefined shape for treating the target tissue.

Figure 5:
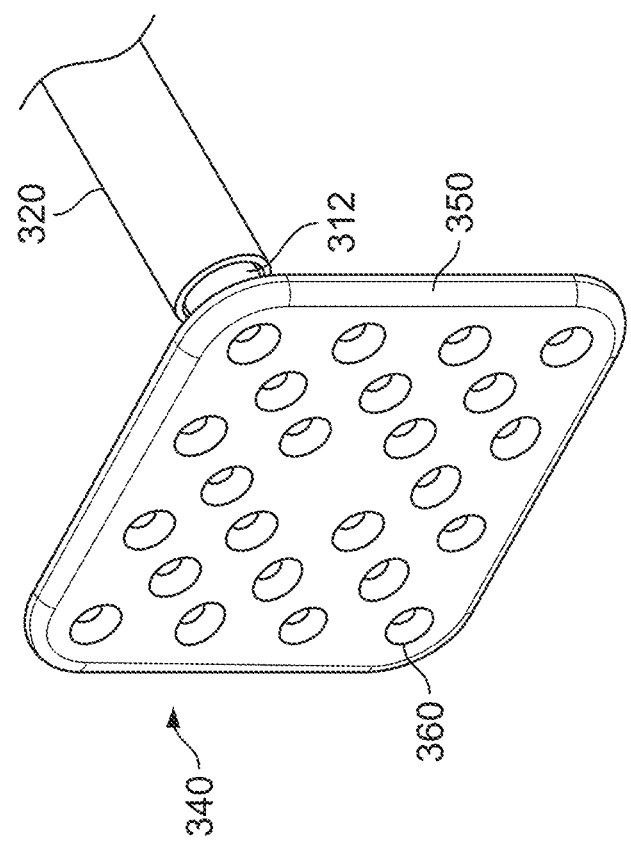
FIG. 5 is an enlarged view of the distal end of the treatment device shown in FIG. 4.

FIG. 5 is an enlarged view of the inflated treatment balloon 340 shown in FIG. 4. The inflated balloon 340 is shown attached to the distal part of a shaft 312. The shaft is thermally insulated such that no tissue damage is caused by shaft if tissue is inadvertently touched by the shaft during a procedure.

The inflated treatment balloon 340 is shown having a thin, planar, and square shape. Structural dimples 360 are shown on the treatment surface. The structural dimples act as reinforcing members, connecting the treatment surface to the rear surface (not shown). The structural reinforcing members serve to maintain the balloon 340 in the mattress-like structure shown in FIG. 5 including the flat treatment surface, when inflated. In embodiments, the balloon comprises 4 to 100 reinforcing members, and more preferably 9 to 50 reinforcing members.

The surface area of the treatment surface of the balloon when inflated may vary. An exemplary range is between 2000 to 10,000 $mm^2$ and more preferably between 3000 and 6000 $mm^2$. An exemplary range for the thickness of the balloon when inflated is between 5 and 10 mm.

The shape of the balloon, when inflated, may also vary. Although the balloon is shown having a square profile in FIGS. 5-6, in other embodiments of the invention, the shape of the balloon is different. Exemplary shapes include circle, rectangle, oval, semi-circle, arcuate or bending, and annular. In embodiments, a kit of devices is provided in which the devices include complementary balloon shapes to cover an entire tissue area. For example, the base of a semi-circular shape may be combined with a side of a square shape to contiguously extend the overall footprint of the tissue to be cooled.

Exemplary materials for making the balloon are thin-walled elastic materials such as, for example, 0.003 inches polyurethane. When an elastic material is used for making the balloon, it is desirable to incorporate the reinforcing structure (e.g., cells 460) described herein to compensate for the stretching of the balloon during inflation and to maintain its shape.

The material of the balloon, shape, thickness, and arrangement of the cells cooperate together to maintain the planar shape of the balloon when inflated and provide a stiffness such that the balloon may be urged against the visceral tissue and maintain its flat planar-like shape.

Figure 6:
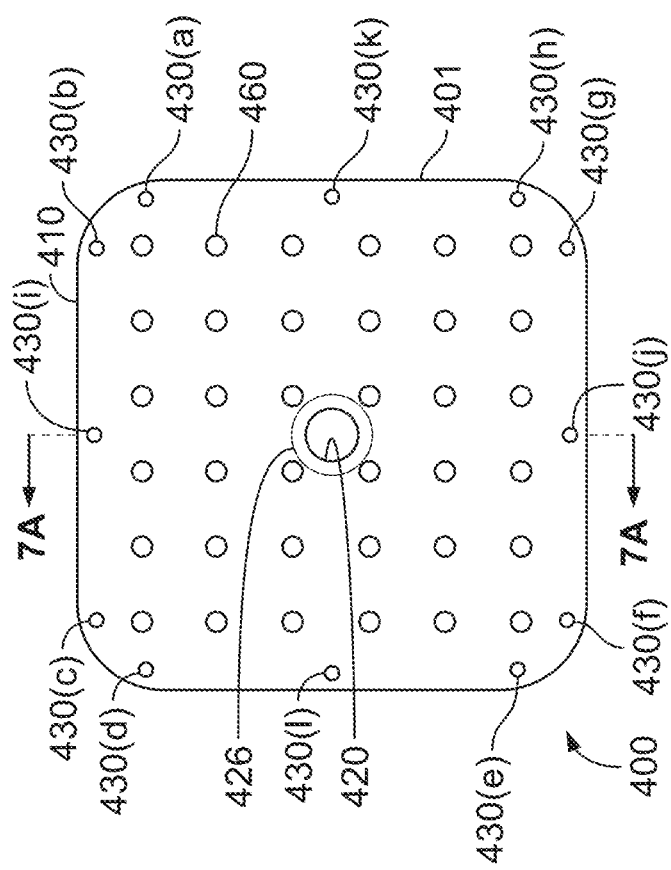
FIG. 6 is a front view of a distal end of a treatment device in an inflated configuration in accordance with an embodiment of the invention.

FIG. 6 shows an enlarged front view of a distal end 400 of a cooling device in accordance with another embodiment of the invention.

Figure 7A:
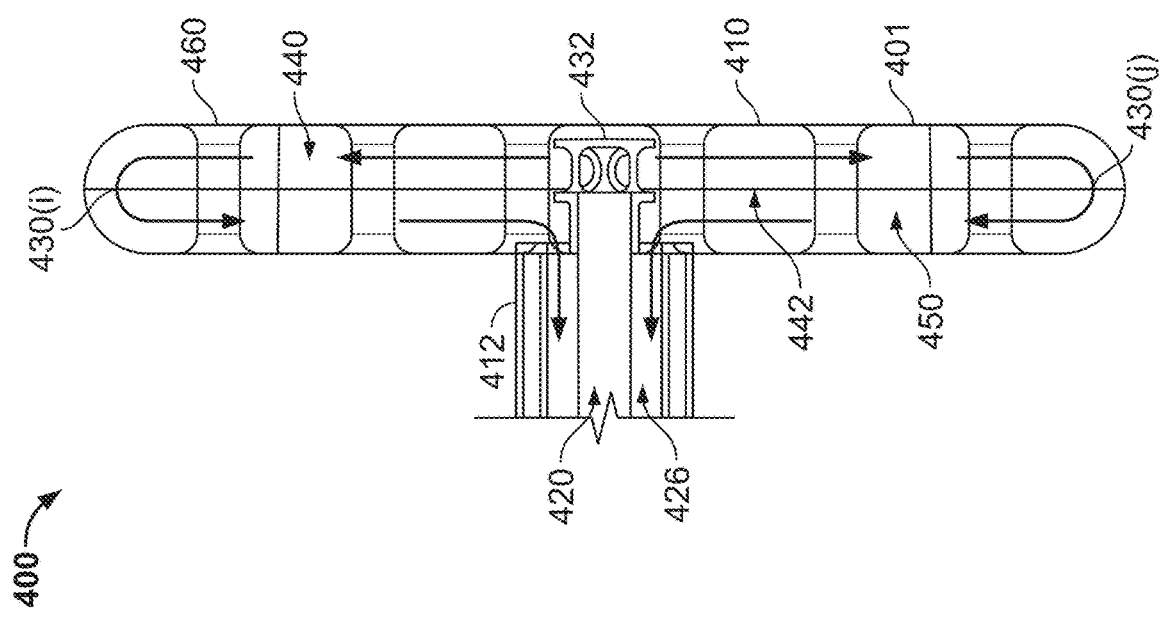
FIG. 7A is a cross sectional view of the treatment device shown in FIG. 6 taken along line 7A-7A.

FIG. 7A shows an enlarged cross sectional view of the distal end 400 taken along line 7A-7A. In this embodiment, the treatment balloon includes two chambers: a frontal chamber 440 for treating the tissue, and a supporting or rear chamber 450 for the fluid return and to provide structural stability. The volume of the rear chamber 450 is roughly equal to that of the front chamber 440 in the balloon shown in FIGS. 6-7A. However, in other embodiments the volumes of the chambers may differ from one another.

A middle layer 442 is shown between the chambers 440, 450. A plurality of openings 430(a)-430(l) are disposed through the middle layer to fluidly connect the frontal treatment chamber 440 to the rear chamber 450. The openings are shown arranged evenly about the periphery of the inflated balloon to optimize flow distribution from the fluid inlet 420, through the treatment chamber 440, the rear chamber 450, and out the return line 426.

In embodiments, the flow is activated by opening valve 432, discussed herein.

The number of openings to fluidly connect the front and rear chambers may vary and in embodiments, ranges from 4 to 40, and more preferably 9 to 30.

Each of the reinforcing members 460 is shown extending from the front treatment surface, through the middle layer 442, and to the rear surface. The shape of the reinforcing members may vary. In embodiments, the reinforcing members take the form of a hollow cylindrical cell, forming a dimple on each of the distal and proximal surfaces of the inflated balloon.

The inventors have found that the arrangement of the openings and reinforcing members, and the size of the chambers creates an even flow distribution when the fluid (e.g., gas) is circulated through the balloon. The balloon quickly forms (and is maintained) in its predefined shape while cooling the target tissues.

Figure 7C:
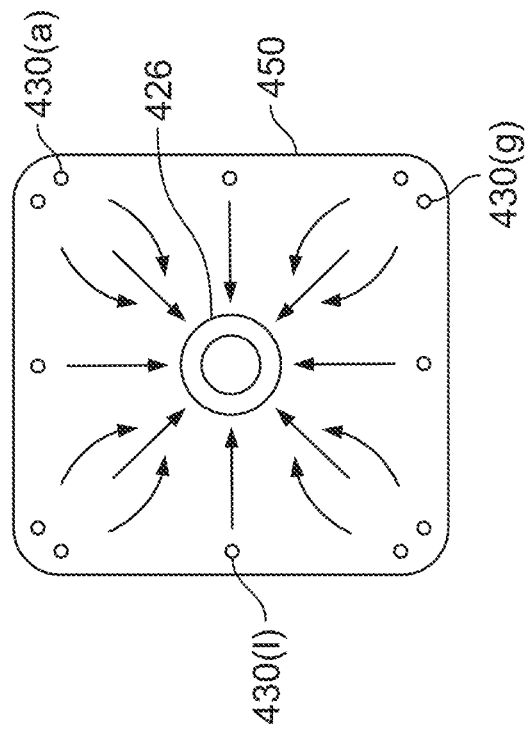
FIGS. 7B-7C are front view flow illustrations of the front and rear chambers, respectively, of the inflatable member shown in FIG. 7A.
Figure 7B:
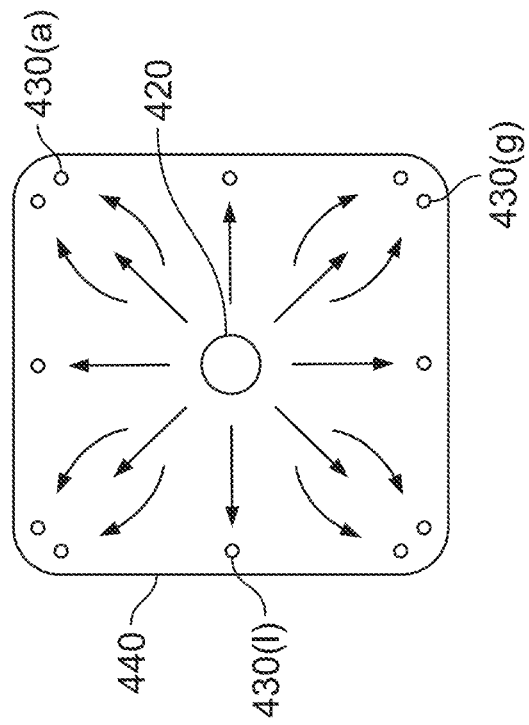

FIGS. 7B-7C are front view flow illustrations of the front and rear chambers, respectively, of the balloon 401 shown in FIG. 7A. With reference to FIG. 7B, front chamber flow pattern radiates from centrally located fluid inlet 420 to peripheral openings 430(a) . . . 430(l) which are shown being equally distributed along the circumference of the divider layer. With reference to FIG. 7C, flow pattern converges or focuses from the dispersed peripheral openings 430(a) . . . 430(l) to the centrally-located annulus-shaped fluid return 426. The initial front-chamber flow pattern combined with the rear-chamber flow pattern (opposite of the front flow pattern) structurally supports the balloon or mattress in the desired planar shape for treating larger surface areas of the tissue. The dual-chamber, opposing gas flow distribution, results in a steady evenly distributed flow of cool fluid across the treatment surface. Splitting the balloon into two chambers (inlet and exhaust) directs the cold inlet gas on the distal (treatment) surface, increasing the cooling efficiency of the device.

After the tissue is treated, the balloon is deflated by withdrawing the gas from the balloon. The entire device can be retracted through a trocar when the balloon is deflated (as described above in connection with FIGS. 2A-2D).

Figure 8:
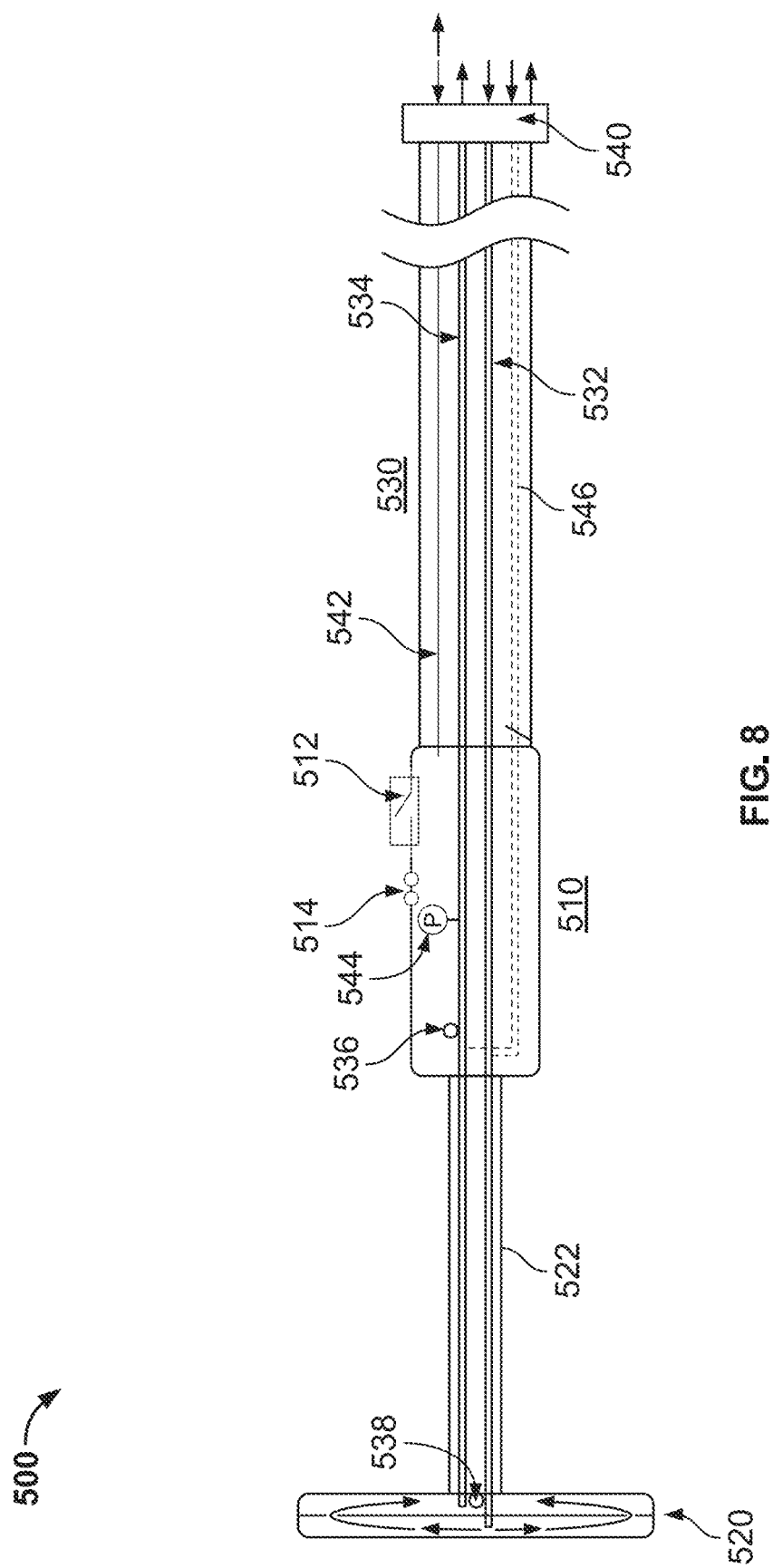
FIG. 8 is a schematic diagram of a treatment device in accordance with an embodiment of the invention.

FIG. 8 is a schematic diagram of a cooling device 500 in accordance with an embodiment of the invention. The device 500 includes a handle 510 and a distal treatment balloon 520 connected to the handle by a rigid shaft 522. A flexible hose or umbilical cord 530 extends rearwardly from the handle. The handle 510, shaft 520 and hose 530 comprise thermal insulation to prevent cooling collateral (and untargeted) tissues.

FIG. 8 also shows the hose 530 terminating at a connector 540. The connector is configured to detachably connect to a console such as console 30, described above with reference to FIG. 1.

Cold fluid inlet and cold fluid return lines 532, 534 are shown extending from the connector 540 through the hose 530, handle 510, shaft 522, and to the balloon 520. The cooling fluid is circulated along the flow lines 532, 534 and through the balloon 520 to treat the tissue as described herein. Preferably, the thermal fluid is a low pressure gas such as low-pressure gaseous carbon dioxide. However, other fluids can be used in the invention except where excluded in any appended claims. Carbon dioxide is a preferred fluid because, and without intending to be bound to theory, it is commonly used in laparoscopic surgery, readily available and well tolerated if leaked in small amounts.

In embodiments, the thermal fluid (e.g., the CO2 gas) is pre-chilled in the console (not shown) using a heat exchanger. An exemplary pre-chill temperature of the fluid in the console ranges from −70 to −40° C., and in some embodiments is about −65° C. An exemplary balloon temperature ranges from −20 and −40° C., and in some embodiments, is about −30° C. Additionally, the balloon temperature can be adjusted but, in accordance with embodiments of the invention, is preferably maintained within a target interval such that tissue ablation is avoided. In embodiments, the target interval for the balloon temperature to avoid tissue ablation ranges from −20° C. to −40° C.

Although the lines 532, 534 are schematically shown as parallel, the lines could be arranged in other configurations such as a coaxial arrangement, preferably, with the incoming gas flowing along a central channel and the return gas flowing through the annulus of the coaxial arrangement.

The handle 510 can include a user interface. The user interface in FIG. 8 includes a power or start switch 512 (e.g., button activated) and visual indicators 514 (e.g., LEDs). The indicators can be operable to provide the status/state of the treatment. Optionally, not shown, the user interface may include a display such as, for example, a touch screen display.

The handle 510 is shown including sensors 536, 538 for evaluating temperature of the outlet line and balloon inlet, respectively. Exemplary sensors are thermocouples.

In embodiments of the invention, the temperature sensing locations within the cooling device are strategically positioned to ensure accurate monitoring of the cooling process. Two temperature sensors can be incorporated into the design. One temperature sensor (e.g., sensor 538) is situated within the inlet stream of the cooling gas as it enters the treatment balloon 520. This placement location allows for real-time monitoring of the gas temperature at the initial point of contact with the tissue. The second temperature sensor (e.g., sensor 536) is positioned within the return stream of the cooling gas as it exits the treatment balloon. This placement facilitates continuous monitoring of the gas temperature after it has interacted with the tissue. Exemplary temperature sensors utilized in the device are type T thermocouples, selected for their precision and reliability. These thermocouples possess a wide sensing range spanning from −200° C. to +200° C., ensuring compatibility with various cooling applications. Furthermore, the sensors exhibit a high degree of accuracy, with a tolerance of ±0.1° C., thus providing precise temperature measurements.

The temperature readings obtained from the sensors represent the instantaneous temperature of the fluid (typically, gas) stream at their respective locations. These measurements serve as indicators of the cooling efficiency and effectiveness of the device. The temperature measurements captured by the sensors reflect the conditions within the gas stream, providing valuable insights into the thermal dynamics of the treatment process and that the tissue temperature remains within the desired range throughout the duration of the procedure.

In embodiments of the invention, a computing device (e.g., processor, computer or controller) is programmed and operable to calculate thermodynamic properties of the gas during the cooling process in real-time. This calculation is based on the continuous monitoring of temperature differentials using temperature sensors strategically placed at the inlet and outlet of the device, discussed herein. The temperature differentials ($\Delta T$), obtained from these sensors is used to calculate the change in enthalpy (energy) of the gas. The change in enthalpy is derived from $\Delta T$ and is the basis for solving the energy equation. By integrating the product of the change in enthalpy and the mass flow rate over time, the total energy transferred to or from the tissue during the ablation process is accurately quantified. This real-time energy calculation enables precise control over the amount of energy delivered to the targeted tissue.

Additionally, in embodiments, the total energy is correlated to temperatures at specific tissue depths. By correlating the total energy removed from the tissue by monitoring temperature at specific tissue depths, a comprehensive understanding of the treatment's efficacy is achieved. This iterative process of data analysis ensures that the device operates optimally, delivering consistent and predictable outcomes.

For example, in embodiments, a desired depth or tissue thickness can be observed/estimated, and the system can be operated to remove a total amount of energy sufficient to treat the tissue based on decreasing the temperature of the tissue at the desired depth to a desired temperature (e.g., between 0 and +10° C. for a relatively deep penetration or thick tissue). The controller and computer can be programmed and operable to allow the physician to tune the energy removed based on time duration, balloon temperature, flowrate or inlet pressure, and the number of devices (or shapes of devices) applied to the tissue.

The heat exchanges and energy calculations, described herein, can be used for monitoring the treatment progress. In embodiments, three indicator lights (e.g., green, yellow, red) on the handle or other operator interface communicate to the surgeon the status of the temperature inside the balloon (e.g., balloon 520) and treatment progression. In embodiments, green indicates that the balloon is in the correct temperature range and ready to be positioned on the tissue; yellow will indicate treatment in progress; a red light will indicate the application is over and the device needs to be detached from the tissue. In embodiments, the red light will change to green once the ballon temperature reaches a treatment temperature.

The handle 510 is also shown including a pressure transducer 544 for evaluating pressure along the outlet fluid line 534. In embodiments, flow rate is computed based on the pressure along the outlet fluid line versus the initial or inlet pressure somewhere along the inlet line (e.g., at the fluid source or regulator). In embodiments, a regulator is arranged along the flowpath between the fluid source and the cooling device to control the pressure to the cooling device. In some embodiments, the regulator can be electronically controlled. In embodiments, the temperature of the fluid being delivered to the balloon and returning from the balloon is monitored. Such information can be input to a control algorithm for controlling flowrate, temperature, duration, and optimizing treatment. Indeed, it is to be appreciated that the number, location and type of sensors may vary widely and the invention is intended to include all such variations unless excluded in any appended claims.

Optionally, the device 500 may have additional functional lines 546. For example, warming gas lines can be incorporated into the device to warm the balloon 520 by actively circulating a warm gas through the system. Alternatively, the warming cycle can be performed by shutting off the flow of the chilled gas; in which case the balloon warms by ambient temperature and radiation (namely, passive warming).

FIG. 8 additionally shows lines for electrical reading/controls 542. Signals and power may be transmitted between the console and the device via the electrical wires 542. The electrical conductors may be housed in one or more dedicated service lumens.

Additionally, in embodiments, valve control lines may be incorporated into the shaft to control the valve(s) 432, described above with reference to FIG. 7A. The valve control lines may be configured to pneumatically (or otherwise) open and close the valves 432.

The above described functional lines can be operably coupled to the console (not shown) via the hose 530 and connector 540. In embodiments, for example, the connector 540 is operable to connect to the console at least the chilled gas lines (inlet line 532 and outlet line 534) and electrical wires 542 (signals and controls in-and-out). However, in other embodiments, the connector is operable to connect additional lines from the device 500 to the console including, for example, warming lines 546, fiber optics, and irrigation or suction lines.

The shape or profile of the connector 540 may vary. An example of a connector is a 'push-to-connect' type connector. In other embodiments, for example, the connector is cylindrical and keyed for proper alignment with the console receptable. Optionally, the connector or the receptable features an outer freely rotating sleeve (comprising internal threads). After the connector is advanced into the receptable, the sleeve is screwed onto external threads present on the opposing component. As the sleeve is further rotated, the connector is further urged into the receptacle, and locked in place.

Optionally, the umbilical cord and handle are configured to detach from one another. For example, the handle may include a port to receive a distal end connector of the umbilical cord. An advantage of this configuration is that the umbilical cord can be supplied 'non-sterile' since it does not pass into the sterile field during the surgical procedure.

Alternative Embodiments

Figure 9:
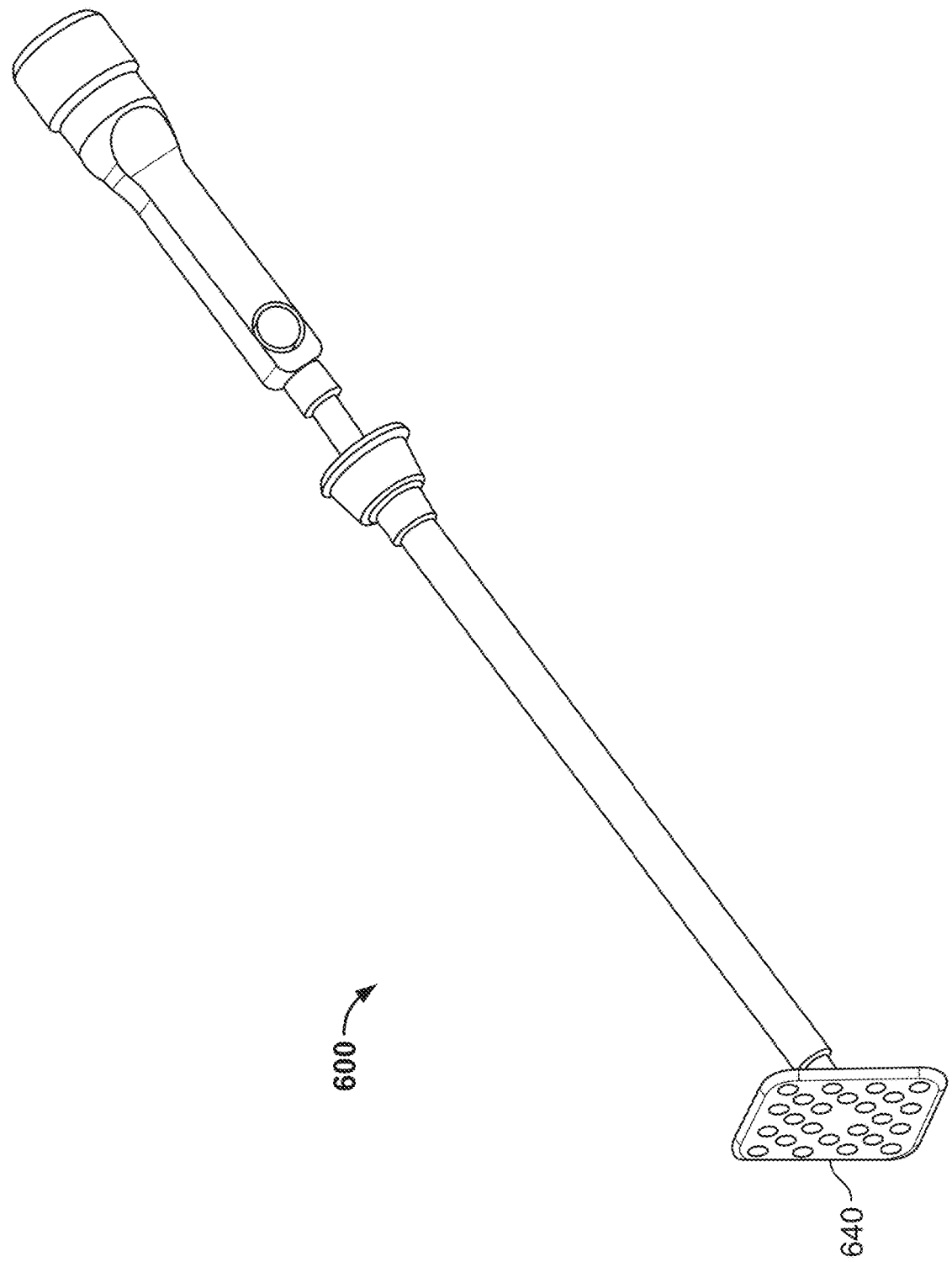
FIG. 9 is a perspective view of a treatment device shown in another configuration in accordance with an embodiment of the invention.
Figure 11:
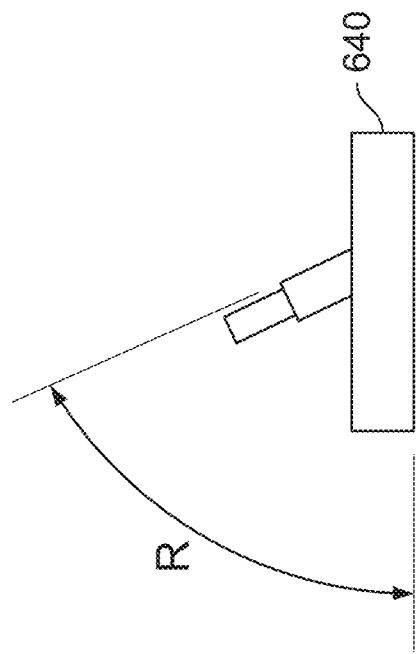
FIGS. 10-11 are side and bottom views, respectively, of the distal treatment section of the device shown in FIG. 9.
Figure 10:
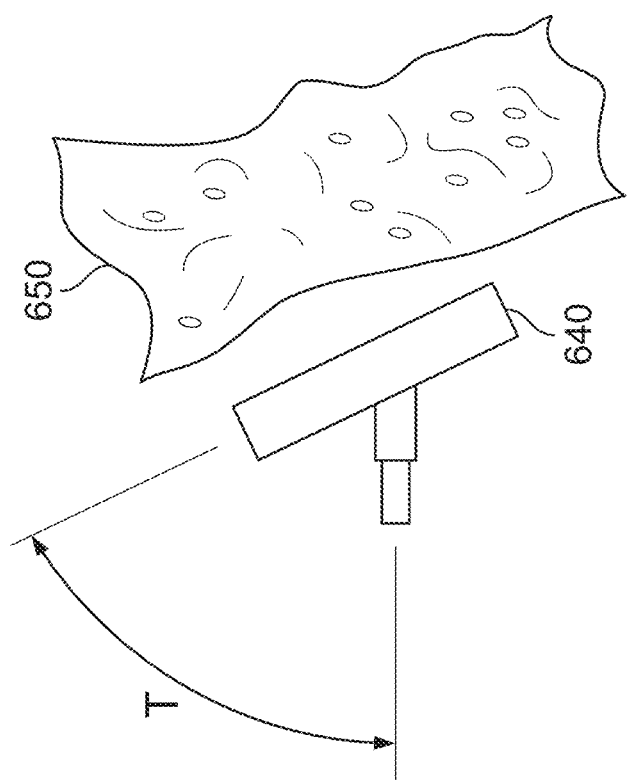

FIG. 9 shows a front side perspective view of another medical cooling device 600 in accordance with an embodiment of the invention comprising a tilted balloon 640. FIGS. 10-11 show side and bottom views, respectively, of the balloon shown in FIG. 9.

The interface between the balloon and the shaft is operable to hinge. In embodiments, the hinge feature comprises a flexible flange, that allows the balloon to articulate when pressed to the mesentery.

In particular, and with reference to FIG. 10, the balloon 640 is operable to adjust to sloped target tissues 650, and/or to adjust to being delivered into the patient at an angle to the target tissues. As the balloon is advanced into contact with the target tissue, the balloon angle (T) relative to the shaft can accommodate non-perpendicular angles. In embodiments, the device 600 is operable to title to an angle (T) less than 90 degrees, and more preferably less than 45 degrees.

FIG. 11 is a bottom view of the balloon 640 shown in FIG. 9. FIG. 11 is provided to illustrate the balloon may also tilt angle (R) when viewed from the bottom. In embodiments, angle (R) can vary from 0 to 90 degrees, and more preferably less than 45 degrees.

Figure 12:
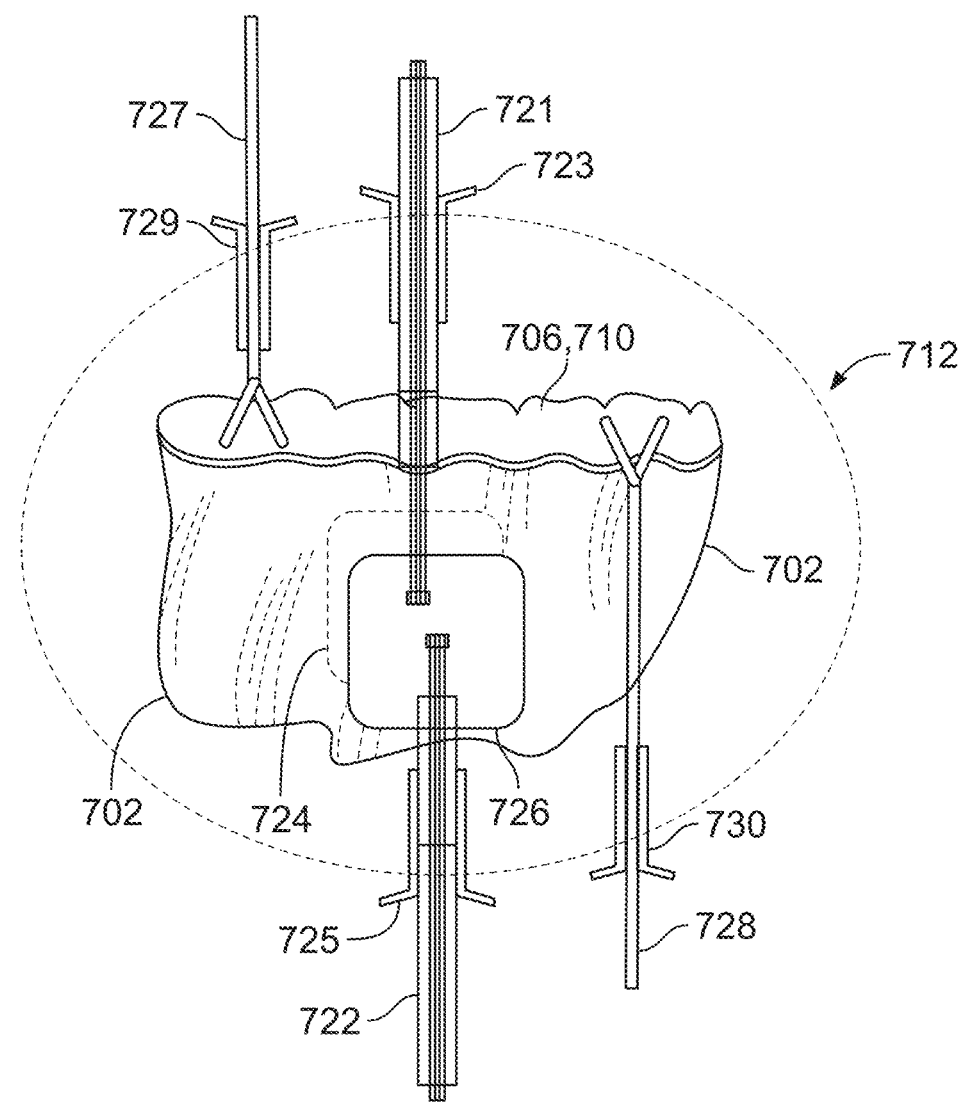
FIG. 12 is an illustration of another laparoscopic method for reducing mesenteric fat in accordance with an embodiment of the invention.

FIG. 12 shows another method in accordance with embodiments of the invention to cool fat by applying cooling power to both sides of a mesentery tissue 702. In FIG. 12, a portion of the mesentery 702 is shown attached to the large intestines 710 or small intestines 706, and two cooling probes 721 and 722 are shown engaged with the mesentery. One cooling probe 721 has been inserted into the body from a first portal 723 and its cooling head 724 has been placed against one surface of the mesentery, and a second cooling probe 722 has been inserted into the body from a second portal 725 and its cooling head 726 has been placed against a second, opposing surface of the mesentery.

Graspers 727 and 728 may be used to manipulate the intestines and/or mesentery sheet as necessary, and are shown inserted into the abdomen through portals 729 and 730. As shown in FIG. 12, a section of the intestine (710, 706) has been grasped with graspers 727, 728 and lifted and/or pulled anteriorly so that the attached section of the mesentery 702 hangs down from the intestine (extends posteriorly, depending on the configuration of the mesentery), exposing mesentery surfaces to the cooling heads of the cooling probes.

As shown in FIG. 12, the cooling probes 721, 722 have been inserted into the abdomen, and the cooling balloons 724, 726 have been deployed on opposite sides of the mesentery section 702, with the cooling faces opposite each other and aligned with each other, namely, in a sandwich-like arrangement with the mesentery section.

In embodiments, the treatment surfaces 724, 726 of the surgical devices are provided with positioning sensors. In embodiments, the position sensors are operable to transmit and/or receive signals from the corresponding transmitters/sensors on the opposing surgical device, to aid in determining the degree of alignment of the surgical devices on opposite surfaces of the tissue 702.

In embodiments, the thickness of the tissue 702 between the treatment surfaces of the inflatable members 724, 726 can be computed based on the signals from the positioning sensors.

In embodiments, the cooling power applied, the desired temperature, and the length of time it is applied, are computed on a processor and based on the thickness of the tissue as determined by the positioning sensors.

Non-limiting examples of position sensors/transmitters for use with embodiments of the invention include electromagnetic sensors, ultrasonic sensors, and laser sensors such as, without limitation, a Hall Effect Current Sensor, TMCS1107 (Texas Instruments); Miniature Ultrasonic Transducer, Piezoceramic transducers, (Precision Acoustics); Ultrasonic distance measuring sensors, UR12.D50-IAMC.7BCU (Baumer Ltd.); Laser distance measuring sensors, O300.DI-GM1J.72CU (Baumer Ltd.); Inductive sensors, eddyNCDT (Micro-Epsilon); and Capacitive sensors, capaNCDT (Micro-Epsilon).

For embodiments, the sensors detect and respond to electromagnetic fields or other energy generated by the opposing sensors (or another external source such as a field generator placed near the operating area). The sensors transmit the distance between the probes, namely, the tissue thickness, or in some embodiments, the sensors are operable to transmit the precise location in three-dimensional space of each probe to the computer and the computer calculates the distance between the probes, namely the tissue thickness.

Preferably, the probes are inserted endoscopically, through a portal or cannula inserted into the abdomen of the patient as described above in connection with FIGS. 2A-2D. With appropriate portal(s) in place, and appropriate insufflation applied to distend the abdomen and create working space (if necessary), the distal ends of probes which carry the cooling heads may be inserted through the portals and applied to the mesentery. Graspers with grasping jaws, or other retracting tools, can be inserted through the abdominal wall to hold the intestine and/or mesentery in a convenient configuration to facilitate application of the cooling heads.

After the cooling operation, the cooling heads may be disengaged from the surfaces of the mesentery sheet. If the cooling operation has resulted in adhesion of the mesentery to the cooling heads, disengagement may be facilitated with active warming by applying energy to the heating elements, supplying warm fluid through the cooling fluid lumens, or waiting for passive warming to release the tissue from the cooling heads.

EXAMPLE

Below is a prophetic example of a procedure in accordance with embodiments of the invention.

Initially, the patient will be taken to the operating room, placed in the standard supine position and prepped and draped as for a standard abdominal laparoscopic procedure.

Following anesthesia and establishing pneumoperitoneum, 2 trocars (12 mm and 5 mm) will be inserted in each lateral aspect of the abdomen, and an additional trocar for the laparoscope will be inserted in the suprapubic area, for a total of 5 trocars.

A cooling device (e.g., cooling device 300 as shown in FIGS. 3, 4) will be inserted bilaterally through each of the 12 mm trocars.

Graspers (e.g., graspers 727 and 728 shown in FIG. 12) will be inserted through each of the 5 mm trocars. The surgeon will present the mesentery by lifting a loop of the intestine using the graspers.

Optionally, the presented tissue thickness can be estimated by the physician in addition to having any measurements from preoperative scans if available.

Next, a cooling balloon (e.g. inflatable member 520 shown in FIG. 8) will contact the mesenteric fat from both sides, so that the two balloons, once deployed will be superimposed on either side of the mesentery as shown in FIG. 12.

The cooling device will be activated as described herein to cool the mesenteric fat to a desired target temperature. Exemplary target temperature ranges (° C.) for the mesenteric fat to be cooled are: 0 to +10, −10 to +10, −20 to 0, −40 to 0, and −40 to −20. Each cooling cycle can be ≤30 sec. and, in some embodiments, between 10 and 15 sec. However, the cooling device itself including, without limitation, the rear balloon chamber and the fluid inlet lines may have a slightly lower temperature than the above listed target tissue temperatures in order to obtain the desired target temperature. In an embodiment, the fluid inlet temperature at the balloon is maintained by circulating thermal fluid through the inflatable member at about −40° C. such that the target tissue temperature (namely, the tissue mass in contact with the balloon) is cooled to about −40° C. immediately adjacent the balloon surface, and up to about −10° C. to +10° C. 3-5 mm from the surface of the balloon, depending on the time duration the cooling is activated. Exemplary time durations range as described herein and can be under one minute and more preferably under 30 sec.

After the cooling stage, a warming cycle is applied to prevent sticking and serves to ensure safe detachment of the balloons from the mesentery.

Following the cooling/thawing cycle, the surgeons will lift an adjunct part of the intestine to treat the next segment of the mesenteric fat and continue this process in a systematic fashion until the mesentery of the small intestine has been treated. The cycles are repeated as needed for 1-2 hours in order to treat each part of the mesenterium along the small intestine.

At the end of the procedure, the balloons are deflated and retracted from the abdominal cavity.

Figure 13:
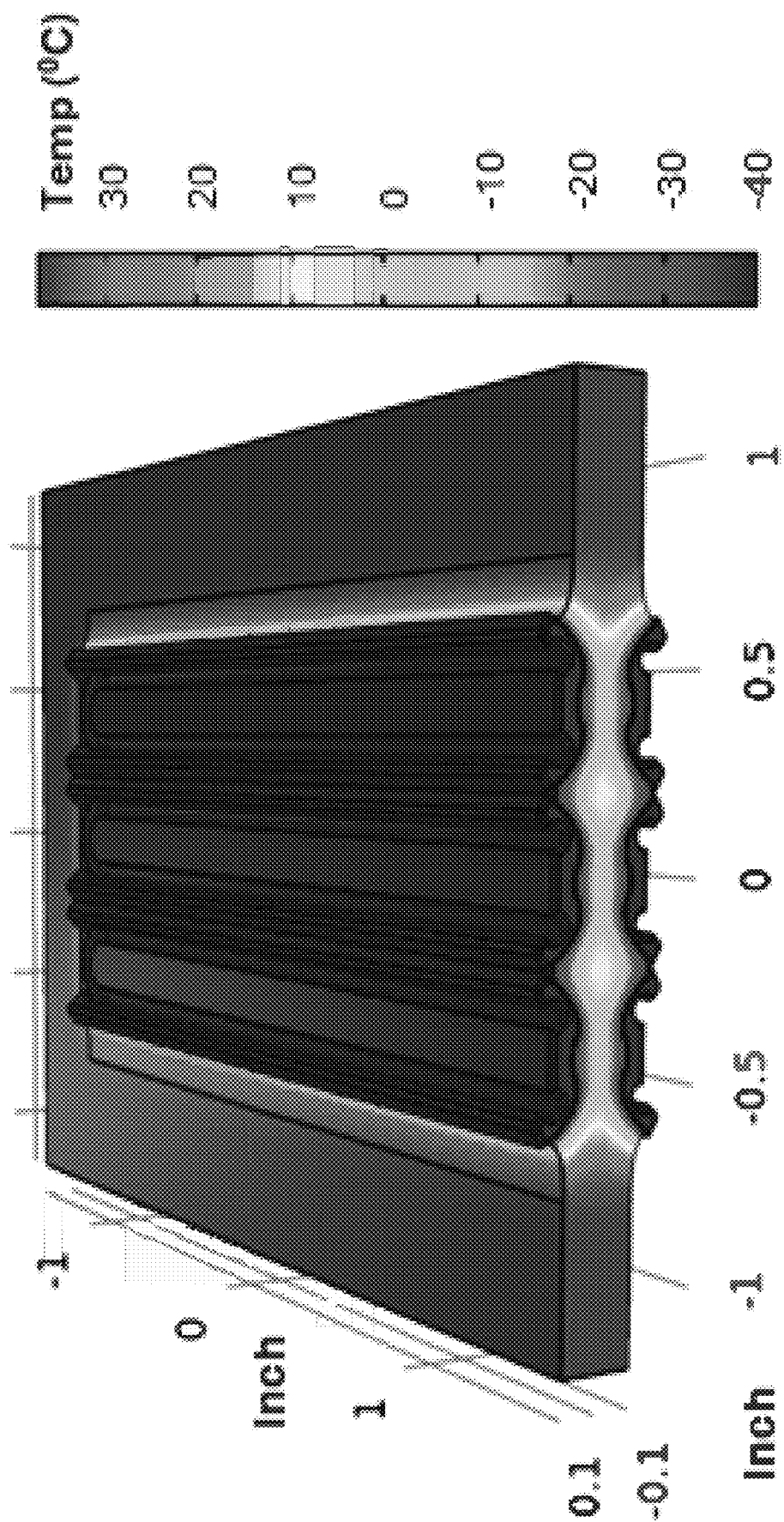
FIG. 13 is a computer simulation of a temperature profile in tissue arising from application of opposing cooling devices in accordance with embodiments of the invention.

FIG. 13 is a three-dimensional computer simulation illustrating a temperature profile during the cooling cycle. The following parameters were used in the computation shown in FIG. 13: the time duration is 18 sec., the tissue is fat, the tissue thickness is 5 mm, the opposing cooling devices are stainless-steel, rectangular in shape, and held at a constant temperature of −40° C. The software used to perform the computer simulation was COSMOL® developed by COSMOL, Inc. (Burlington, Massachusetts).

The chart shows that the full thickness of the tissue (5 mm) decreases to +10° C. (or less) after only 18 seconds. The temperature of the tissue decreases the closer to the surface of the instrument, and ultimately approaches about −40° C. at the surface of the instruments. This data shows the full transmural thickness of a 5 mm thick fat can be cooled to 10° C. or less after only 18 seconds when the cooling devices are applied to opposite sides of the tissue and held at the proper temperature.

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations; or operations in another order than that specifically described above. Additionally, any of the components and steps described herein may be combined with one another in any logical manner except where such components or steps would be exclusive to one another. Accordingly, the scope and spirit of the invention should be judged in terms of the claims, which follow as well as the legal equivalents thereof.

The invention claimed is:

1. A system for cooling tissue comprising:
    a first surgical device comprising:
        an elongate shaft;
        an inflatable member, the inflatable member comprising a small-profile deflated configuration for being advanced into the abdominal cavity of the patient, and a large-profile inflated configuration comprising a planar distal treatment surface for treating the visceral fat;
        a fluid inlet line to transport a thermal fluid to the inflatable member;
        a fluid return line to transport the thermal fluid from the inflatable member; and
        wherein the thermal fluid is circulated through the inflatable member by the inlet line and outlet line;
        a temperature sensor arranged to measure temperature of the thermal fluid entering (or within) the inflatable member (Ti); and
        a pressure control device to control the pressure of the thermal fluid transported to the inflatable member (Pi); and
    a second surgical device comprising:
        an elongate shaft;
        an inflatable member, the inflatable member comprising a small-profile deflated configuration for being advanced into the abdominal cavity of the patient, and a large-profile inflated configuration comprising a planar distal treatment surface for treating the visceral fat;
        a fluid inlet line to transport a thermal fluid to the inflatable member;
        a fluid return line to transport the thermal fluid from the inflatable member; and wherein the thermal fluid is circulated through the inflatable member by the inlet line and outlet line;

a temperature sensor arranged to measure temperature of the thermal fluid entering (or within) the inflatable member (Ti); and a pressure control device to control the pressure of the thermal fluid transported to the inflatable member (Pi); and wherein the distal treatment surface of each of the first surgical device and the second surgical device is provided with a positioning sensor;

a controller operable to:

determine thickness of the visceral fat based on signals from the positioning sensors;

compute a desired temperature and duration for applying cooling to the visceral fat based on the determine step; and maintain, for each of the first surgical device and the second surgical device, the measured temperature (Ti) at the desired temperature by adjusting the Pi using the pressure control device for the duration.

2. The system as recited in claim 1, wherein each said pressure control device is a regulator.

3. The system as recited in claim 1, wherein the controller is operable to compute total energy removed to the visceral fat.

4. The system of claim 1, wherein each said inflatable member comprises a treatment chamber separated from a supporting chamber by a divider, the divider comprises at least one opening for fluidly connecting the treatment chamber to the supporting chamber, and wherein the inlet line provides the thermal fluid to the treatment chamber via an inlet port and the outlet line transports the thermal fluid from the supporting chamber via an outlet port.

5. The system of claim 4, wherein the inlet port is centrally located for each of the first and second surgical devices; and wherein the at least one opening comprises a plurality of openings.

6. The system of claim 5, wherein the openings are arranged around the periphery of the divider.

7. The system of claim 4, wherein the supporting chamber and the front chamber have a substantially equal volume.

8. The system of claim 5, wherein, for each of the first and second surgical devices, the inlet port, outlet port, and plurality of openings are operable to create a first flow pattern in the treatment chamber and a second flow pattern in the support chamber, wherein the second flow pattern flows in an opposite direction to the first flow pattern.

9. The system of claim 8, wherein the first flow pattern radiates from the centrally located inlet port; and wherein the second flow pattern converges from the circumference of the support chamber to the centrally located outlet port, serving to maintain flatness of the planar treatment surface and to direct the thermal fluid evenly therethrough such that the planar distal treatment surface has a substantially uniform temperature and remains planar even when applied against the visceral fat.

10. The system of claim 1, wherein the positioning sensors are operable to transmit and receive signal from corresponding transmitters/sensors on the opposing distal treatment surface.

11. The system of claim 1, wherein the controller maintains Ti for each of the first and second surgical device between −35° C. and −40° C.

12. The system of claim 1, wherein each of the first and second surgical devices further comprises a plurality of reinforcing members to maintain the treatment surface in a fixed relation to the rear surface when the inflatable member is inflated.

13. The system of claim 12, wherein each of the reinforcing members of each of the first and second surgical devices are closed cells extending from the rear surface to the treatment surface; wherein the reinforcing members are cylindrically-shaped.

14. The system of claim 12, wherein each of the reinforcing members form a dimple at the treatment surface.

15. The system of claim 1, wherein each said inflatable member has a square profile in the inflated configuration; and has a thickness between 5-10 mm when inflated.

16. The system of claim 1, wherein each said first and second surgical device further comprises at least one sensor to monitor a property of the thermal fluid in the return line.

17. The system of claim 1, wherein the thermal fluid is CO2.

* * * * *